3,183,118
REACTION PRODUCTS OF NICKEL, COPPER AND MERCURY SALTS AND PROCESS FOR RENDERING COTTON FABRIC ROT RESISTANT THEREWITH

Charles J. Conner, New Orleans, La., assignor to the United States of America as represented by the Secretary of Agriculture
No Drawing. Filed Jan. 22, 1963, Ser. No. 253,232
39 Claims. (Cl. 117—138.5)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the formation, and subsequent deposition on cotton fabrics of complex water soluble salts, which are prepared by solubilizing copper, mercury, and nickel salts, that are normally water insoluble, with zirconyl acetate. Among the objects of this invention is the production of water soluble reaction products that exhibit fungicidal activity and have utility in the art of treating fabrics.

According to this invention a copper borate—and other water insoluble salts—are made water soluble by mixing with zirconyl acetate in acetic acid solution. This produces in the case of copper a deep blue reaction product which is ultimately insoluble in water. Generally, the copper borate and the other metallic salts are soluble in organic solvents only. The formation of these substances enhances their utility as fungistatic agents in that they are water soluble. One of the essentials of chemical treatment of fabrics has been the economic feasibility of the application. Obviously the use of water soluble chemicals reduces the cost of treatments.

The most satisfactory concentration of zirconium oxide in the zirconyl acetate solutions is from 13% to 20%, calculated as $ZrO_2$. These concentrations are ideal for the dissolution and complexing of the copper borate in the zirconyl acetate solutions. These deep blue colored solutions can be further solubilized in water, from a maximum of 30% solids to a visible blue, which contains a total solids of 0.1%. This form of the copper reaction product has been labeled "Normal Copper-Zirconyl Boro Acetate."

This water soluble reaction product undergoes a change when heated, as indicated below, and this change is manifested by the fact that the water soluble substance becomes insoluble when heated above a particular critical temperature. The insoluble form—basic blue crystalline salts—of this reaction product is referred to as "Basic Copper-Zirconyl Boro Acetate."

Other water soluble reaction products capable of being prepared by the action of the zirconyl acetate solution upon the water insoluble salts include reaction products prepared from the following salts:

Phenyl mercury acetate
Phenyl mercury benzoate
Phenyl mercury borate
Phenyl mercury hydroxide
Phenyl mercury lactate
Phenyl mercury phthalate
Phenyl mercury propionate
Di-phenyl mercury ammonium-8-hydroxyquinolate
Di-phenyl mercury ammonium maleate All these water soluble reaction products prepared from the above listed salts as well as those prepared from their homologs, can be applied to cotton to produce materials which will have fungistatic properties.

A suitable copper borate consists of a salt having a CuO to $B_2O_3$ molar ratio of 2:3, and the copper borate must be anhydrous for the solubilizing action to take place. The zirconyl acetate solutions are available commercially, and a zirconyl acetate solution suitable for the purpose of this invention is one having the following specifications:

| | |
|---|---|
| $ZrO_2$ | 13% to 20%. |
| Acetic acid | 12.5% to 20%. |
| pH at 20° C. | 3.0 to 4.0. |
| Density of solution | 10.0 to 10.5 lbs./gal. |

NOTE: Zirconyl acetate is sometimes referred to as diacetato-zirconylic acid.

The reactants have the following formula:

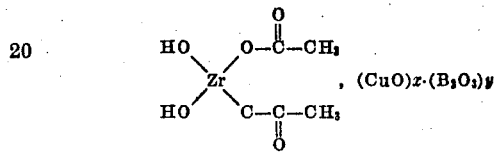

Zirconyl acetate    Copper borate

NOTE.—$x$ and $y$ represent molar ratios.

The solubility of copper borate in zirconyl acetate solutions varies as the molar ratio of CuO to $B_2O_3$ varies. Where the ratio of $x:y$ is 1:1.76 the solubility is very slight, and the copper content is very low while the zirconium complex is high. Where the ratio is 2:3 the solubility of copper borate is the greatest, and the copper complex content is high. As noted earlier, the copper borate and zirconyl acetate combine to form a deep blue complex water soluble salt. When this water soluble salt is heated to dryness acetic acid is liberated, and a blue water insoluble salt is formed. This water insoluble salt shows a definite crystal structure under the microscope.

The mechanisms involved in the production of these preparations may be explained theoretically by the following formula:

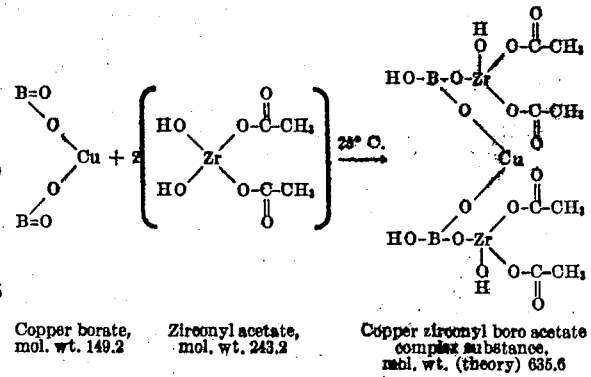

Support of this theoretical explanation is based on the maximum composition of 2.5 grams of copper borate with 7.8 grams of zirconyl acetate (100%), which the preceding formula represents. Furthermore, the formation of basic zirconyl acetate, as accepted in literature according to the following reaction:

$$H_2ZrO_2(C_2H_3O_2)_2 \rightleftharpoons HZrO_2C_2H_3O_2 - HC_2H_3O_2$$

(Ref.: Industrial and Engineering Chemistry, vol. 46, page 528, March 1954)

In the case of the formation of basic copper zirconyl boro acetate the theoretical mechanism would be relatively explained as follows:

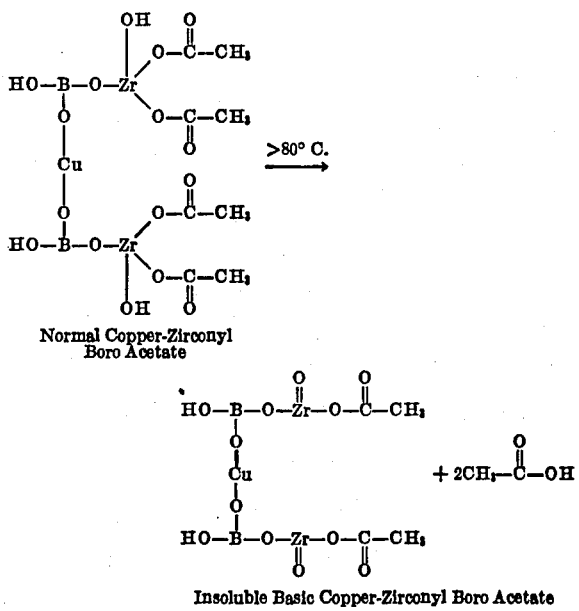

Normal Copper-Zirconyl Boro Acetate

Insoluble Basic Copper-Zirconyl Boro Acetate

The formation of the other complex substances mentioned in this text cannot be as readily theorized upon, and for purposes of this invention will be looked upon merely as water soluble reaction products.

The procedure for the preparation of all these water soluble substances that are the subject of this invention is the same, proceeds readily at room temperature (25° C.), and the rate of reaction can be increased by elevating the temperature to no higher than 80° C. This upper limit is to be avoided in order to avoid dissociation, which is synonymous with formation of a water insoluble product. In the case of the copper zirconyl boro acetate reaction product, up to 2.5 grams of the copper borate will complex with 7.8 grams of the zirconyl acetate (100%), by reacting at room temperature over a 72 hour period of time. Time offers no particular difficulty, since the copper borate is allowed to macerate with occasional agitation over this period, any quantity being prepared at one time.

For fungicidal application to the cotton aqueous solutions has been found to be perfectly stable at room temperatures (ca. 25° C.) for several weeks, and can be indefinitely stable as long as the upper limit of 80° C. is avoided. Insolubility however becomes an asset in the case of treated cotton fabric which has been cured past this upper limit in that the insoluble material, and hence the fungistatic properties, will remain in the fabric through many launderings.

The water soluble copper zirconyl boro acetate reaction product has been applied from solids concentrations with add ons as low as 0.97% Cu and 1.86% Zr to cotton cloth (80 x 80), to produce a good uniform application on the padder, and further cured on the cloth at 145° C. producing a basic salt, which withstood a 4 hour leaching test without loss. A sample of the treated and cured cloth which was buried in a composted soil bed showed negligible rot after one week, and retained 90% of the original breaking strength, while an untreated control which underwent the same burial treatment had practically disintegrated, and could not be tested. The basic copper zirconyl boro acetate reaction product possesses all of the qualities for high fungistatic—and possibly fungicidal—activity containing three known elements of noted fungicidal activity, i.e., copper, zirconium, and boron. Furthermore, the insolubility of the complex substance formed may enhance the fabric properties in that cellulosic materials may be made to crosslink when impregnated with these substances. The potential of crosslinked zirconium salts is known.

NOTE: In all following examples percentages are by weight.

*Example 1*

3.0 grams of copper borate ($2CuO \cdot 3B_2O_3$) anhydrous salt and 30 grams of zirconyl acetate solution (13% $ZrO_2$ and 12.5% acetic acid) in water were mixed and allowed to stand for 48 hours at room temperature (25° C.), with occasional agitation. At the end of this time approximately two-thirds of the borate had dissolved to produce a deep blue solution of the water soluble reaction product formed.

*Example 2*

3.0 grams of copper borate ($2CuO \cdot 3B_2O_3$) anhydrous salt, 30 grams of zirconyl acetate solution (13% $ZrO_2$ and 12.5% acetic acid), and 30 grams of distilled water were mixed and allowed to stand for 72 hours at room temperature (25°), with occasional agitation. At the end of this time approximately 2.5 grams of the borate had dissolved to produce a deep blue solution of the water soluble reaction product formed. A greater quantity of the reaction product was dissolved when the quantities of water and time of Example 1 were increased.

*Example 3*

3.0 grams of copper borate ($2CuO \cdot 3B_2O_3$) anhydrous salt, 30 grams of zirconyl acetate solution (13% $ZrO_2$ and 12.5% acetic acid), and 30 grams of distilled water were mixed and allowed to stand for 24 hours at room temperature (25° C.), with occasional agitation. At the end of this time approximately two-thirds of the borate had dissolved. The mix was then heated with uniform stirring for 1 hour at 50° C. At the end of this time approximately 2.5 grams of the borate dissolved to form a deep blue solution. Less time was employed when heat was employed in the second phase of the preparation of both Examples 1 and 2.

*Example 4*

3.0 grams of copper borate ($2CuO \cdot 3B_2O_3$) anhydrous salt and 30 grams of zirconyl acetate solution (13% $ZrO_2$ and 12.5% acetic acid) were mixed and allowed to stand for 48 hours, with occasional agitation. At the end of this time, a small quantity of green crystalline sediment remained. The mix was then treated with 30 grams of distilled water, agitated, and allowed to stand for 24 more hours. A deep blue solution resulted, with a 0.5 gram of residual insoluble matter.

When 30 cubic centimeters of the clear blue solution are slowly evaporated to dryness on the hot plate, the blue solution becomes cloudy and a blue gelatinous paste results, which on further drying results in a blue crystalline powder. This powder consists of fine crystals which are easily distinguished under the microscope.

0.5 gram of the dry crystals from the preparation were mixed with 50 cubic centimeters of distilled water, and stirred for 48 hours. No evidence of solubility could be detected visually through diminishing of the crystals or color of the copper ion in solution. A 28% ammonium hydroxide test showed only slight change of color in the water layer, which indicated that the crystals were practically insoluble. Under the microscope the crystals appeared uniform and blue.

*Example 5*

A deep blue solution prepared as in Example 4 was filtered from the residue, and 50 cubic centimeters of this solution were diluted with an equal amount of water to give a reaction product containing 2.49% zirconium and 1.30% copper. A sample of 80 x 80 cotton fabric was treated with this solution by padding twice through tight rolls to give a wet pickup of 75%, equivalent to 1.86% zirconium and 0.97% copper. The wet treated cloth was practically colorless. Cure was effected at 145° for 5 minutes in an electric oven. The cloth developed a pale blue-green color, as a result of the formation of a basic insoluble salt. Color of the treatment was uniform and not objectionable. Samples of the cured treated cloth were leached for 1 hour with tap water, while other samples were leached for 4 hours with distilled water. No evidence of loss of treatment or color change was noted with either leaching procedure, and resistance to wetting was notable. Similar results were obtained with cure cycles of 110° to 160° C. for time intervals of 1 to 10 minutes. The in situ change from the soluble to the insoluble form of the copper borate-zirconyl acetate reaction product requires that curing temperature be at least about 80° C.

A section of the cured treated cloth was cut into 5 strips of 1 inch by seven inches, each, and five strips were cut from the untreated cloth, as control. Both samples were buried in the rot bed (composted soil). At the end of a period of 7 days the samples were dug up and examined. The control samples were disintegrating and showed an average retained strength of 3.8%, while the copper zirconyl basic salt treated samples showed negligible evidence of attack, and retained 90% of the original strength. The treated samples retained a pale blue-green color, and showed no evidence of treatment loss through leaching or chemical action. As stated earlier, the treated samples contained a 1.86% zirconium and 0.97% copper before burial.

*Example 6*

3.0 grams of copper borate ($2CuO \cdot 3B_2O_3$) anhydrous salt, 30 grams of zirconyl acetate solution (20% $ZrO_2$ and 20% acetic acid) and 30 grams of distilled water were mixed and allowed to stand for 48 hours at room temperature (25° C.), with occasional agitation. At the end of this time, approximately two-thirds of the borate had dissolved. The mix was warmed to 60° C. with stirring for a period of one half hour. At the end of this period of time practically all of the borate dissolved to form a deep blue solution and an insoluble residue of less than 0.5 gram. The increase in concentration of the zirconyl acetate solution did not appear to increase the rate of solubility, even though heat was applied to the mixture.

*Example 7*

3.0 grams of copper borate ($2CuO \cdot 3B_2O_3$) anhydrous salt, 30 grams of zirconyl acetate solution (20% $ZrO_2$ and 20% acetic acid) and 30 grams of distilled water were mixed and allowed to stand for 72 hours at room temperature (25° C.), with occasional agitation. At the end of this time practically all of the borate had dissolved. The mix was heated, with continuous stirring, slowly up to 80° C. over a period of 20 minutes. All of the residue dissolved, and a deep blue reaction product of copper ion was formed. At 80° C., a slight evidence of a gel was formed on the bottom of the container, due to dissociation. The flask (container) was allowed to cool at room temperature as soon as a gelation was noted. When cool, a deep blue solution of the copper-zirconyl derivative was obtained. The gel had redissolved, and the blue solution was stable thereafter, at room temperature. All of the copper borate had dissolved during this procedure. Since gelation was noted at 80° C., it is evident that this temperature is critical, and that slightly higher temperatures than this would be sufficient to produce an insoluble deposit on cloth.

*Example 8*

0.05 gram of phenyl mercuric acetate was added to 3 ml. of dimethyl formamide and warmed to 80° C. Practically all of the salt dissolved. The solution was allowed to cool to 40° C., when 5 ml. of 13% $ZrO_2$ zirconyl acetate was added. A clear solution resulted which could be diluted with 3 volumes of water, without precipitation.

The water soluble reaction product, phenyl mercuric zirconyl boro-acetate, theoretically represented by the formula

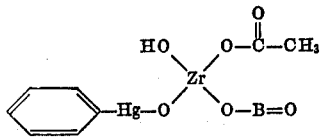

when heated above 80° C. yields the water insoluble reaction product, phenyl mercuric zirconyl borate, theoretically represented by the formula

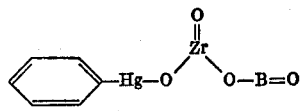

The water soluble reaction product was applied to 80 x 80 cotton fabric as well as duck through conventional padding to give a 75% wet pickup and a 0.3% mercury add-on, with 1.6% to 6.5% $ZrO_2$ contents (as basic acetate). Cures were effected at 110°–160° C. for 1–10 minutes. Results of the burial tests showed a 95% strength retention of the treated fabrics over a three week exposure period. Some of the samples retained 100% strength, and visually appeared equal to the fabric before burial.

*Example 9*

A solution of the phenyl mercuric acetato-zirconic acid reaction product, which was prepared by dissolving 0.05 gram of phenyl mercuric acetate in 3 ml. of dimethyl formamide, and reacting with 5 ml. of the 13% $ZrO_2$ zirconyl acetate solution was evaporated to dryness on the hot plate, forming a white granular insoluble basic compound. This product, phenyl mercuric zirconium acetate, was insoluble in water. The powder was stirred with 5 ml. of distilled water and filtered after 5 minutes. The clear filtrate was found to be practically free of mercury. The remaining powder was dissolved in 1 ml. of warm concentrated nitric acid. The solution showed a heavy mercury content, the mercury being in the insoluble basic compound, which is formed in heating the mixture to dryness.

The water soluble reaction product, phenyl mercuric acetato-zirconic acid, theoretically represented by the formula

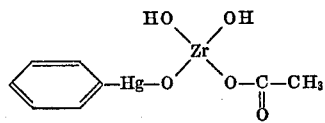

when heated above 80° C. yields the water insoluble reaction product, phenyl mercuric zirconyl acetate, theoretically represented by the formula

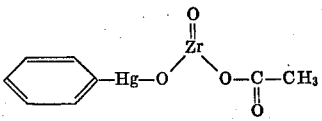

The lactate, benzoate, propionate, etc., were found to produce basic insoluble residues when the aqueous reaction product was heated to dryness as in the case of the phenyl mercuric acetate. This is significant in application of fabrics through padding and oven curing, to deposit a phenyl mercuric derivative from an aqueous solution.

The water soluble reaction product, phenyl mercuric zirconyl lactato-acetate, theoretically represented by the formula

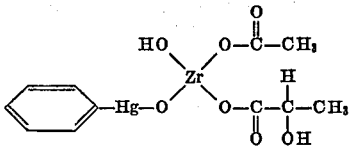

when heated above 80° C. yields the water insoluble reaction product, phenyl mercuric zirconyl lactate, theoretically represented by the formula

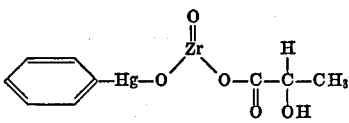

The water soluble reaction product, phenyl mercuric zirconyl benzoate-acetate, theoretically represented by the formula

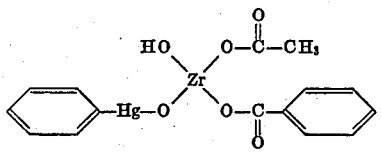

when heated above 80° C. yields the water insoluble reaction product, phenyl mercuric zirconyl benzoate, theoretically represented by the formula

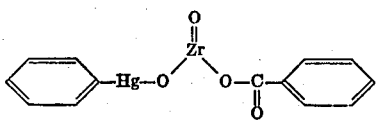

The water soluble reaction product, phenyl mercuric zirconyl propionate-acetate, theoretically represented by the formula

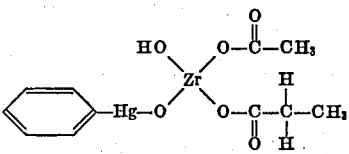

when heated above 80° C. yields the water insoluble reaction product, phenyl mercuric zirconyl propionate, theoretically represented by the formula

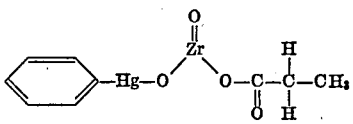

*Example 10*

The procedure in Example 8 was repeated in the preparation of the reaction products employing phenyl mercuric hydroxide, phenyl mercuric lactate, phenyl mercuric nitrate, phenyl mercuric propionate, phenyl mercuric phthalate, as well as diphenyl mercuric ammonium-8-hydroxy quinolinolate, and diphenyl mercuric ammonium maleate in place of phenyl mercuric acetate. Basically all these preparations were the same. The diphenyl mercuric ammonium-8-hydroxy quinolinolate yielded a deep orange colored solution when dissolved in DMF, but formed a blackish-green soluble reaction product upon reaction with the zirconyl acetate solution.

The water soluble reaction product, phenyl mercuric zirconyl nitro-acetate, theoretically represented by the formula

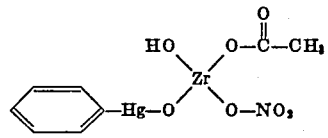

when heated above 80° C. yields the water insoluble reaction product, phenyl mercuric zirconyl nitrate, theoretically represented by the formula

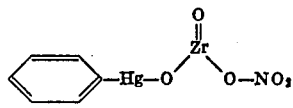

The water soluble reaction product, phenyl mercuric zirconyl phthalate-acetate, theoretically represented by the formula

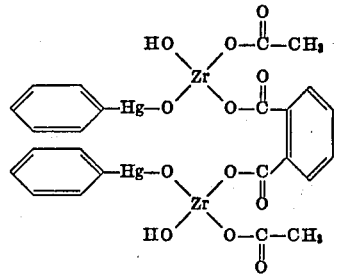

when heated above 80° C. yields the water insoluble reaction product, phenyl mercuric zirconyl phthalate, theoretically represented by the formula

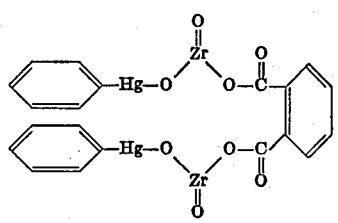

The water soluble reaction product, bis(phenyl mercuric acetato zirconyl) ammonium-8-hydroxyquinolinolate, theoretically represented by the formula

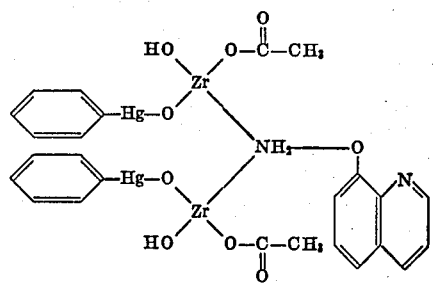

when heated above 80° C. yields the water insoluble reaction product, bis(phenyl mercuric zirconyl)ammonium-8-hydroxyquinolinolate, theoretically represented by the formula

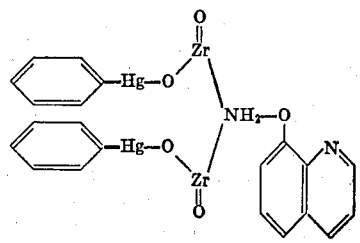

The water soluble reaction product, bis(phenyl mercuric ammonium zirconyl acetate)maleate, theoretically represented by the formula

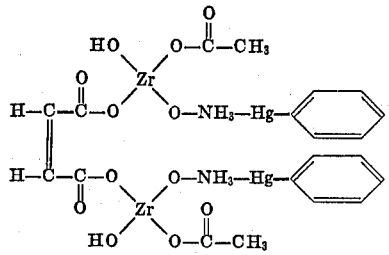

when heated above 80° C. yields the water insoluble reaction product, bis(phenyl mercuric ammonium zirconyl(maleate, theoretically represented by the formula

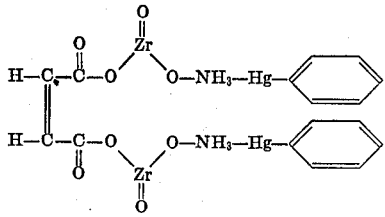

The phenyl mercuric propionate reaction product was applied to 80 x 80 cotton observing the same procedures and percentages as in Example 8. The results of the burial in the composed bed showed that the fabric still retained 100% of its original strength after a three week exposure period.

The phenyl mercuric lactate reaction product was likewise applied to 80 x 80 cotton. The results of the burial tests showed that the fabric sample retained 100% of its original breaking strength at the completion of one week, 86% of its original strength at the completion of two weeks, and 36% after three weeks of burial. The untreated control retains only 10% at the end of one week of burial, and is completely rotted at the end of two weeks.

*Example 11*

A quantity of 0.05 gram of phenyl mercuric borate was added to 3 ml. of DMF, and stirred for 3 minutes. Partial solubility occurred, and 5 ml. of 13% $ZrO_2$ zirconyl acetate solution was added. A clear solution was formed. This solution was then diluted with distilled water to about 100 ml., and remained clear.

When some of the clear solution was heated to boiling and evaporated to dryness a water insoluble crystalline powder resulted. If the phenyl mercuric borate is dissolved in DMF alone, and the solution diluted with water, the phenyl borate is precipitated, showing that a water soluble reaction product is formed with zirconyl acetate.

*Example 12*

A quantity of 0.05 gram of phenyl mercuric benzoate was added to 3 ml. of DMF, and the mix was warmed to 50° C., when a clear solution resulted. The warm solution was treated with 5 ml. of 13% $ZrO_2$ zirconyl acetate solution. A precipitate formed but redissolved to give a clear solution. This solution was further diluted with an equal volume of distilled water, and no precipitation occurred.

*Example 13*

A quantity of 3 grams of nickel borate was mixed with 30 ml. of 13% $ZrO_2$ by weight zirconyl acetate solution, and allowed to stand for 96 hours at room temperature. At the end of this time, 30 ml. of water were added and mixed, and the reactants allowed to stand 48 hours more. The clear green solution, containing the water soluble reaction product nickel zirconyl boroacetate, was decanted and allowed to evaporate to dryness at room temperature. The undissolved residue (nickel borate) weighed 1.49 grams, showing that 1.51 grams of nickel borate dissolved to form a complex substance. The green complex solution evaporated to a mixture of light green crystals and a light green glassy mass. When dry, the light green crystals, basic nickel zirconyl boroacetate, were not found to be soluble in water at room temperature. When boiled with water, the green crystals formed a light green gelatinous precipitate similar to the formation of basic zirconyl acetate from zirconyl acetate on boiling.

The water soluble reaction product, nickel zirconyl boroacetate, theoretically represented by the formula

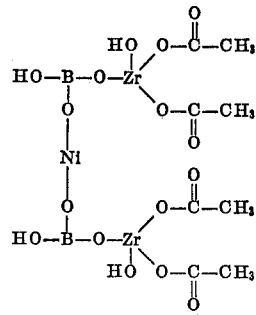

when heated above 80° C. yields the water insoluble reaction product, basic nickel zirconyl boroacetate, theoretically represented by the formula

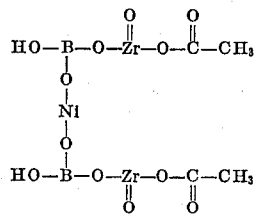

I claim:
1. A process for preparing a water soluble copper borate-zirconyl acetate reaction product comprising mixing about from 1 to 3 parts by weight of anhydrous copper borate with about 30 parts by weight of a solution of zirconyl acetate containing from 13% to 20% by weight of $ZrO_2$ and from 12.5% to 20% by weight of acetic acid and heating the resulting mixture at a temperature ranging from about 25° C. to a temperature not exceeding 80° C. to produce the water soluble copper borate-zirconyl acetate reaction product having the formula

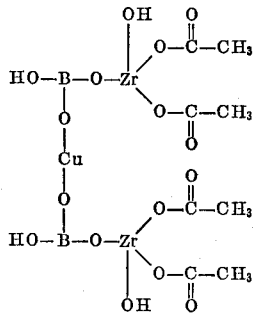

2. A process of preparing a water soluble reaction product containing mercury and zirconium comprising suspending about 1.67 parts by weight of a mercury compound selected from the group consisting of phenyl mercuric acetate, phenyl mercuric benzoate, phenyl mercuric borate, phenyl mercuric hydroxide, phenyl mercuric lactate, phenyl mercuric nitrate, phenyl mercuric phthalate, phenyl mercuric propionate, diphenyl mercuric ammonium-8-hydroxy quinolinolate, and diphenyl mercuric ammonium maleate in dimethyl formamide, heating the resulting suspension at a temperature not exceeding 80° C. to dissolve the mercury compound, and mixing the resulting solution with 167 parts by weight of a solution of zirconyl acetate containing from 13% to 20% by weight of $ZrO_2$ and from 12.5% to 20% by weight of acetic acid to produce a water soluble reaction product containing mercury and zirconium.

3. The process of claim 2 wherein the mercury compound is phenyl mercuric acetate.
4. The process of claim 2 wherein the mercury compound is phenyl mercuric benzoate.
5. The process of claim 2 wherein the mercury compound is phenyl mercuric borate.
6. The process of claim 2 wherein the mercury compound is phenyl mercuric hydroxide.
7. The process of claim 2 wherein the mercury compound is phenyl mercuric lactate.
8. The process of claim 2 wherein the mercury compound is phenyl mercuric nitrate.
9. The process of claim 2 wherein the mercury compound is phenyl mercuric phthalate.
10. The process of claim 2 wherein the mercury compound is phenyl mercuric propionate.
11. The process of claim 2 wherein the mercury compound is diphenyl mercuric ammonium-8-hydroxy quinolinolate.
12. The process of claim 2 wherein the mercury compound is diphenyl mercuric ammonium maleate.
13. A process of preparing a water soluble nickel borate-zirconyl acetate reaction product comprising mixing about from 1 to 3 parts by weight of nickel borate with about 30 parts by weight of a solution of zirconyl acetate containing from 13% to 20% by weight of $ZrO_2$ and from 12.5% to 20% by weight of acetic acid and heating the resulting mixture at a temperature ranging from about 25° C. to a temperature not exceeding 80° C. to produce a water soluble nickel borate-zirconyl acetate reaction product.
14. A process comprising heating to dryness the water soluble reaction product of copper borate and zirconyl acetate having the formula $$\begin{array}{c} \text{OH} \quad\quad\quad\quad\quad\quad\quad\quad\quad\quad O \\ | \quad\quad\quad\quad\quad\quad\quad\quad\quad\quad O-\overset{\|}{C}-CH_3 \\ HO-B-O-\overset{|}{Zr} \\ | \quad\quad\quad\quad\quad\quad\quad\quad\quad O-\overset{\|}{C}-CH_3 \\ O \quad\quad\quad\quad\quad\quad\quad\quad\quad\quad O \\ | \\ Cu \\ | \quad\quad\quad\quad\quad\quad\quad\quad\quad\quad O \\ O \quad\quad\quad\quad\quad\quad\quad\quad\quad O-\overset{\|}{C}-CH_3 \\ | \\ HO-B-O-\overset{|}{Zr} \\ | \quad\quad\quad\quad\quad\quad\quad\quad\quad O-\overset{\|}{C}-CH_3 \\ OH \quad\quad\quad\quad\quad\quad\quad\quad O \end{array}$$

at a temperature exceeding 80° C. to liberate acetic acid and produce the water insoluble reaction product of copper borate and zirconyl acetate having the formula $$\begin{array}{c} O \quad\quad\quad O \\ HO-B-O-\overset{\|}{Zr}-O-\overset{\|}{C}-CH_3 \\ | \\ O \\ | \\ Cu \\ | \\ O \\ | \\ HO-B-O-Zr-O-C-CH_3 \\ \|\quad\quad\| \\ O\quad\quad O \end{array}$$

15. A process of preparing a water insoluble reaction product containing mercury and zirconium comprising suspending about 1.67 parts by weight of a mercury compound selected from the group consisting of phenyl mercuric acetate, phenyl mercuric benzoate, phenyl mercuric borate, phenyl mercuric hydroxide, phenyl mercuric lactate, phenyl mercuric nitrate, phenyl mercuric phthalate, phenyl mercuric propionate, diphenyl mercuric ammonium-8-hydroxy quinolinolate, and diphenyl mercuric ammonium maleate in dimethyl formamide, heating the resulting suspension at a temperature not exceeding 80° C. to dissolve the mercury compound, mixing the resulting solution with about 167 parts by weight of a solution of zirconyl acetate containing from 13% to 20% by weight of $ZrO_2$ and from 12.5% to 20% by weight of acetic acid to produce a water soluble reaction product containing mercury and zirconium, and heating the water soluble reaction product to dryness at a temperature exceeding 80° C. to liberate acetic acid and produce a water insoluble reaction product containing mercury and zirconium.

16. The process of claim 15 wherein the mercury compound is phenyl mercuric acetate.
17. The process of claim 15 wherein the mercury compound is phenyl mercuric benzoate.
18. The process of claim 15 wherein the mercury compound is phenyl mercuric borate.
19. The process of claim 15 wherein the mercury compound is phenyl mercuric hydroxide.
20. The process of claim 15 wherein the mercury compound is phenyl mercuric lactate.
21. The process of claim 15 wherein the mercury compound is phenyl mercuric nitrate.
22. The process of claim 15 wherein the mercury compound is phenyl mercuric phthalate.
23. The process of claim 15 wherein the mercury compound is phenyl mercuric propionate.
24. The process of claim 15 wherein the mercury compound is diphenyl mercuric ammonium-8-hydroxy quinolinolate.
25. The process of claim 15 wherein the mercury compound is diphenyl mercuric amomnium maleate.
26. A process of preparing a water insoluble reaction product of nickel borate and zirconyl acetate comprising mixing about from 1 to 3 parts by weight of nickel borate with about 30 parts by weight of a solution of zirconyl acetate containing from 13% to 20% by weight of $ZrO_2$ and from 12.5% to 20% by weight of acetic acid, heating the resulting mixture at a temperature ranging from about 25° C. to a temperature not exceeding 80° C. to produce a water soluble nickel borate-zirconyl acetate reaction product, and heating the said water soluble reaction product to dryness at a temperature exceeding 80° C. to liberate acetic acid and produce a water insoluble reaction product of nickel borate and zirconyl acetate.
27. A process for rendering a cotton fabric rot resistant comprising padding the cotton fabric to a wet pickup of about 75% with an aqueous solution containing water soluble copper zirconyl boro-acetate dissolved therein in an amount corresponding to about 2.49% zirconium and about 1.30% copper to achieve an add-on of at least 1.86% zirconium by weight and at least 0.97% copper by weight, and heating the padded fabric at a temperature of about 110° C. to 160° C. for a period of about from 1 to 10 minutes, the shorter time intervals being employed with the higher temperatures, to insolubilize the water soluble copper zirconyl boro-acetate.
28. A process for rendering a cotton fabric rot resistant comprising padding the cotton fabric to a wet pickup of about 75% with an aqueous solution of a member selected from the group consisting of water soluble phenyl mercuric zirconyl boro-acetate, phenyl mercuric acetato-zirconic acid, phenyl mercuric zirconyl lactato-acetate, phenyl mercuric zirconyl benzoate-acetate, phenyl mercuric zirconyl propionate-acetate, phenyl mercuric zirconyl nitro-acetate, phenyl mercuric zirconyl phthalate-acetate, bis(phenyl mercuric acetato-zirconyl)ammonium-8-hydroxyquinolinolate, and bis(phenyl mercuric ammonium zirconyl acetate)maleate dissolved therein in an amount sufficient to achieve an add-on of at least 0.3% by weight of mercury, and heating the padded fabric at a temperature of about 110° C. to 160° C. for a period of about from 1 to 10 minutes, the shorter time intervals being employed with the higher temperatures, to insolubilize the water soluble member.

29. The process of claim 28 wherein the water soluble member is phenyl mercuric zirconyl boro-acetate.

30. The process of claim 28 wherein the water soluble member is phenyl mercuric acetato-zirconic acid.

31. The process of claim 28 wherein the water soluble member is phenyl mercuric zirconyl lactato-acetate.

32. The process of claim 28 wherein the water soluble member is phenyl mercuric zirconyl benzoate-acetate.

33. The process of claim 28 wherein the water soluble member is phenyl mercuric zirconyl propionate-acetate.

34. The process of claim 28 wherein the water soluble member is phenyl mercuric zirconyl nitro-acetate.

35. The process of claim 28 wherein the water soluble member is phenyl mercuric zirconyl phthalate-acetate.

36. The process of claim 28 wherein the water soluble member is bis(phenyl mercuric acetato-zirconyl)ammonium-8-hydroxyquinolinolate.

37. The process of claim 28 wherein the water soluble member is bis(phenyl mercuric ammonium zirconyl acetate)maleate.

38. A water soluble reaction product of copper borate and zirconyl acetate having the formula

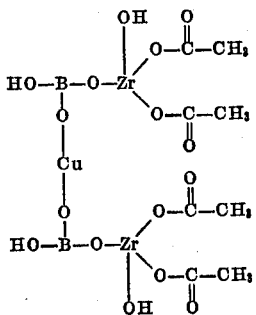

39. A water insoluble reaction product of copper borate and zirconyl acetate having the formula

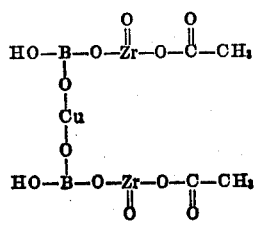

References Cited by the Examiner

UNITED STATES PATENTS 2,482,816  9/49  Van Mater _____ 117—121
2,698,263  12/54  Weick _____ 117—138.5

OTHER REFERENCES

Industrial and Engineering Chemistry, vol. 46, pp. 528–539, March 1954.

WILLIAM D. MARTIN, *Primary Examiner.*

RICHARD D. NEVIUS, *Examiner.*